(12) United States Patent
Sharrit et al.

(10) Patent No.: US 6,185,205 B1
(45) Date of Patent: Feb. 6, 2001

(54) METHOD AND APPARATUS FOR PROVIDING GLOBAL COMMUNICATIONS INTEROPERABILITY

(75) Inventors: John Paul Sharrit; John Wayne Shepard, both of Fountain Hills, AZ (US)

(73) Assignee: Motorola, Inc., Schaumburg, IL (US)

(*) Notice: Under 35 U.S.C. 154(b), the term of this patent shall be extended for 0 days.

(21) Appl. No.: 09/088,008

(22) Filed: Jun. 1, 1998

(51) Int. Cl.[7] .............................. H04L 12/66; G06F 15/16
(52) U.S. Cl. ........................ 370/389; 370/463; 709/230
(58) Field of Search .................................. 370/400, 401, 370/463, 338, 310, 389, 465, 466, 467, 402; 709/230, 249

(56) References Cited

U.S. PATENT DOCUMENTS

| | | | |
|---|---|---|---|
| 4,665,514 | * 5/1987 | Ching et al. | 370/392 |
| 5,537,607 | 7/1996 | Ploger, III | 395/830 |
| 5,602,843 | 2/1997 | Gray | 370/338 |
| 5,712,628 | 1/1998 | Phillips et al. | 340/825.54 |
| 5,712,866 | 1/1998 | Stein et al. | 375/200 |
| 5,845,283 | * 12/1998 | Williams et al. | 707/101 |

FOREIGN PATENT DOCUMENTS 0 822 667 A2 * 4/1998 (EP) .

* cited by examiner

*Primary Examiner*—Alpus H. Hsu
*Assistant Examiner*—Afsar M. Qureshi
(74) *Attorney, Agent, or Firm*—John C. Scott; Frank J. Bogacz

(57) ABSTRACT

An information transfer system (ITS) (10) is capable of providing interoperability among a large number of external communications systems that each use different signal formats. The ITS (10) includes a group of interface units having a plurality of wireless interface units (12a–12n) for converting between a plurality of wireless signal formats and a common signal format and a plurality of wired interface units (14a–14n) for converting between a plurality of wired signal formats and the common signal format. In addition, the ITS (10) includes a switch (16) for selectively establishing connections between interface units in the group of interface units. Some or all of the interface units are dynamically reconfigurable for supporting new or changing signal formats.

46 Claims, 5 Drawing Sheets

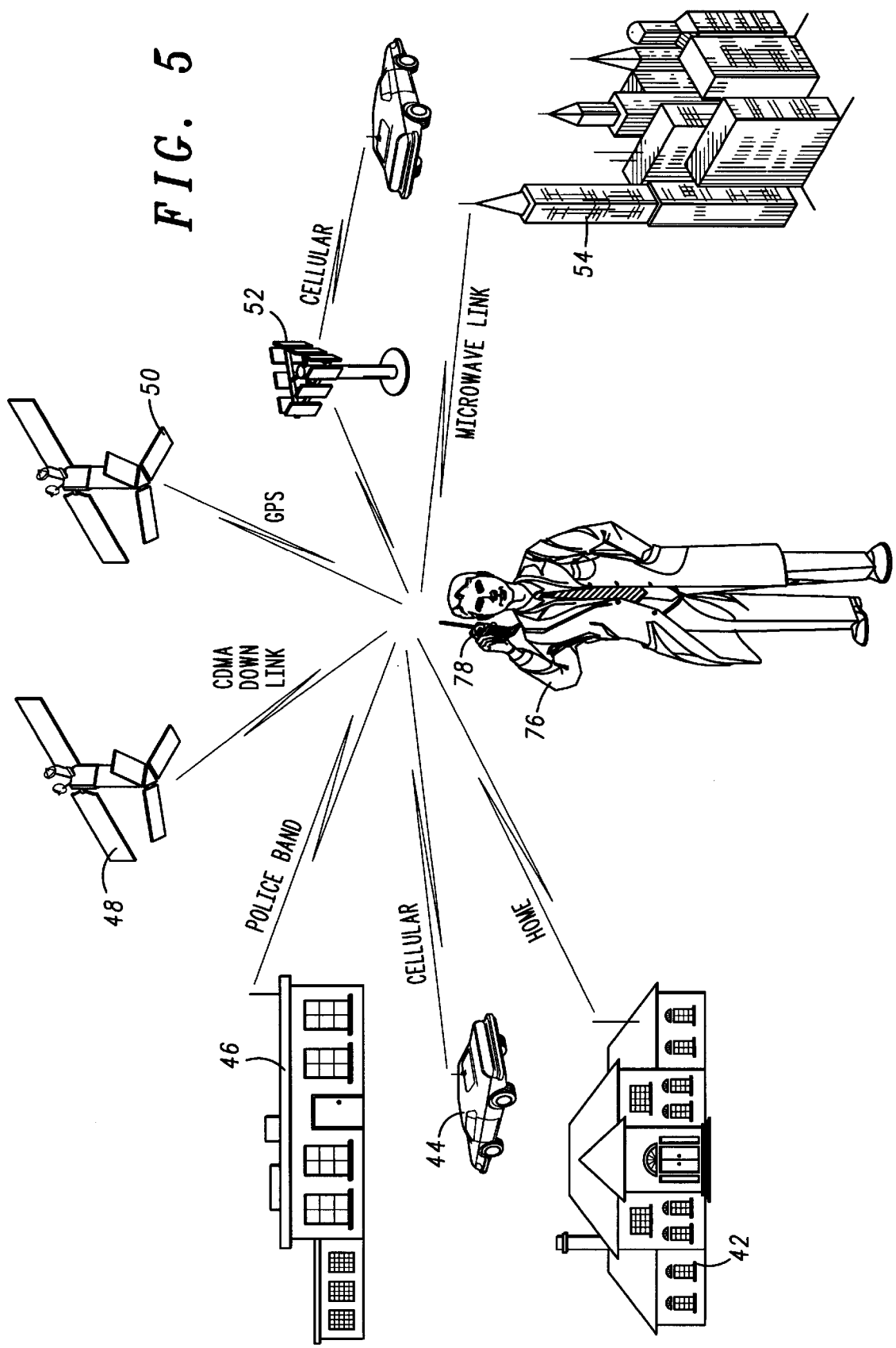

METHOD AND APPARATUS FOR PROVIDING GLOBAL COMMUNICATIONS INTEROPERABILITY

STATEMENT OF GOVERNMENT RIGHTS

This invention was made with government support under Contract No. F30602-95-C-0026 awarded by the U.S. Air Force. The Government has certain rights in this invention.

FIELD OF THE INVENTION

The invention relates in general to communications systems and, more particularly, to devices for providing interoperability between communications systems.

BACKGROUND OF THE INVENTION

There is currently a large and increasing number of communications systems in operation across the globe. In general, each of these communications systems uses a specific communications signal format for transferring signals between users of the system. The signal format used by a particular system is generally chosen based on a number of considerations, such as, for example, the physical medium being used to transfer signals (e.g., air, wire, and/or optical fiber) and the type of information being transferred (e.g., voice, video, and/or data). As such, the signal format used by one communications system will normally be different from those used by other communications systems, so that the other systems will not be able to recognize signals transmitted by the first system, and vice versa. Systems that are not able to recognize each other's signal formats are known as incompatible communications systems.

In the past, if it were desired that two or more incompatible systems interoperate with one another, a single custom hardware-based point solution would be developed to provide for compatibility between the systems. Point solutions generally have very limited application to the specific signal formats they are designed to operate with. Therefore, although point solutions perform well within their limited range of applicability, they carry with them high development, installation, and maintenance costs due to their customized nature. In addition, point solutions are not adaptable to changing signal formats and usually require redesign if signal formatting changes are made.

Because the number of communications systems being implemented is increasing, there is a corresponding increase in the demand for useable spectrum. This increased demand is forcing a redistribution of spectrum ownership resulting in, for example, changes in air interface protocols, relocation of services to other parts of the electromagnetic spectrum, and increased local control of nationally reserved spectrum, to name a few. This spectral volatility creates a condition where signal formats are continuously evolving and transforming based on current spectrum allocation schemes. Consequently, the likelihood that a given point solution will become outdated, and therefore useless, is greatly increased.

Therefore, there is a need for a system that can provide interoperability between a number of communication systems that each utilize a different signal formatting scheme. The system will preferably be adaptable for supporting new and/or changing signal formats. In addition, the system will desirably be extensible for supporting additional signal formats as the need arises. Furthermore, the system should be able to support a relatively large number of signal formats for providing interoperability between the correspondingly large number of communications systems currently being implemented.

BRIEF DESCRIPTION OF THE DRAWINGS

FIG. 5 is a diagram illustrating the information transfer system of FIG. 4 being used in a handheld communicator application.

DETAILED DESCRIPTION OF THE DRAWINGS

The present invention relates to an information transfer system that is capable of providing interoperability between a number of communication systems that each utilize a different signal formatting scheme. The information transfer system includes a plurality of wireless interface units that are each capable of converting a signal between a unique wireless signal format and a common signal format. The information transfer system also includes a plurality of wired interface units that are each capable of converting between a unique wired signal format and the common signal format. Each interface unit communicates with a corresponding external communications system via an external communications channel. Connections between interface units are established within the information transfer system to provide interoperability between two or more previously incompatible external communications systems. In this way, the information transfer system is capable of providing global interoperability between a multitude of communication systems using different waveforms and/or protocols. In a preferred embodiment, the information transfer system is dynamically reconfigurable to support new and/or changing signal formatting schemes. The information transfer system of the present invention can be used in both stationary applications (e.g., base station and home implementations) and mobile applications (e.g., air, maritime, vehicular, and handheld implementations).

Figure 1:
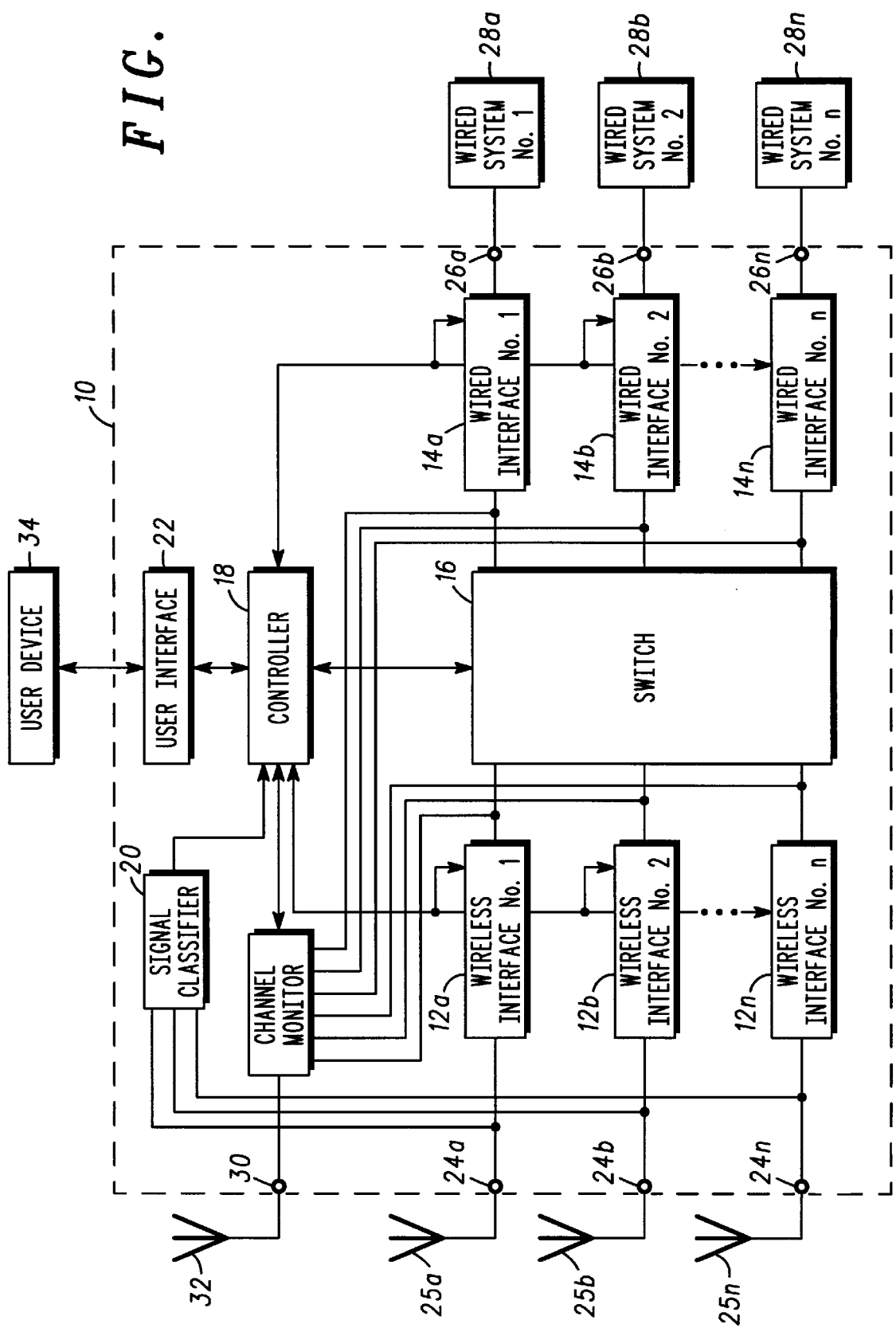
FIG. 1 is a block diagram illustrating an information transfer system in accordance with one embodiment of the present invention.

FIG. 1 illustrates an information transfer system (ITS) 10 in accordance with one embodiment of the present invention. As illustrated, the ITS 10 includes: a plurality of wireless interface units 12*a*–12*n*, a plurality of wired interface units 14*a*–14*n*, a switch 16, a controller 18, a signal classifier 20, a channel monitor 21, and a user interface 22. Each of the wireless interface units 12*a*–12*n* includes a corresponding antenna port 24*a*–24*n* for use in communicating with one or more antennas 25*a*–25*n*. The channel monitor 21 can also include an antenna port 30 for communicating with an antenna 32. The wireless interface units 12*a*–12*n* and the channel monitor 21 can each be connected to a dedicated antenna, as shown in FIG. 1, or antenna sharing can be implemented. In one embodiment, for example, a number of units utilize a single phased array antenna generating multiple beams. Other antenna arrangements are also possible. Each of the wired interface units 14*a*–14*n* includes a corresponding port 26*a*–26*n* for connecting to an external wired communications entity. As illustrated in FIG. 1, for example, wired interface unit 14*a* is connected to external wired system 28*a* via port 26*a*; wired interface unit 14*b* is connected to external wired system 28*b* via port 26*b*; and wired interface unit 14*n* is connected to external wired system 28*n* via port 26*n*.

As described above, each of the wireless interface units 12*a*–12*n* is operative for converting a communications signal between a predetermined wireless signal format and a common signal format used by the switch 16. As such, the wireless interface units 12*a*–12*n* can each include any functionality that is necessary for performing the required conversion. In one embodiment of the present invention, each of the wireless interface units 12*a*–12*n* includes a radio transceiver configured to operate with a predetermined radio waveform. Each radio transceiver converts signals between a wireless signal format and a baseband data format. The wireless interface units 12*a*–12*n* can be hardware-based units, software-based units, or hybrid hardware/software units. The external communications systems serviced by the wireless interface units 12*a*–12*n* (can include virtually any communications entity that utilizes a wireless channel.

Each wired interface unit 14*a*–14*n* is operative for converting a signal between a signal format used by a corresponding external wired system 28*a*–28*n* and the common signal format. As with the wireless interface units 12*a*12*n*, the wired interface units 14*a*–14*n* can include any functionality necessary for performing the required conversion. As will be described in greater detail, the external wired systems 28*a*–28*n* can include virtually any type of communications entity that communicates information via a wired connection (e.g., wire, cable, optical fiber, or other tangible waveguiding structure). For example, one or more of the external wired systems 28*a*–28*n* can include a wired communications network, such as: a public switched telephone network (PSTN), a synchronous optical network (SONET), a local area network (LAN), a wide area network (WAN), the internet, a cable television network, an asynchronous transfer mode (ATM) network, or any other network providing wired access. In addition, one or more of the external wired systems 28*a*–28*n* can include a single hardwired input/output device, such as a personal computer, a terminal, or other device using serial and/or parallel protocols. Other wired systems are also possible.

As used herein, the term "signal format" refers to a unique combination of signal characteristics that distinguish one signal from another. In general, systems that utilize a particular signal format cannot recognize signals having other formats. In this regard, a signal format can include a designation of one or more of the following signal characteristics: waveform type (e.g., center frequency, modulation type, etc.), information type (e.g., voice, video, data, etc.), signal protocol, multiple access type (e.g., CDMA, TDMA, FDMA, etc.), signal encryption type, signal vocoder type, and others.

The switch 16 is operative for establishing a connection between any two or more of the interface units 12*a*–12*n*, 14*a*–14*n*. In this manner, a connection can be established between selected external communications systems. Because the switch 16 operates on information having the common signal format, interoperability is achieved between all connected systems. The switch 16 can establish a connection between, for example: (a) one (or more) wireless interface unit(s) and one (or more) wired interface unit(s), (b) two or more wireless interface units, or (c) two or more wired interface units. In one scenario, for example, the switch 16 establishes a conferencing connection between users at three or more external communications systems. The conferencing connection allows users at each of the connected systems to transmit/receive information to/from users at each of the other systems in the connection. In another scenario, the switch 16 establishes a broadcast connection between external communications systems. That is, the switch 16 establishes a one way connection between one interface unit (either wired or wireless) and a plurality of other interface units (either all wired, all wireless, or both wired and wireless) so that a message can be simultaneously delivered to a plurality of end users at different external communications systems. In yet another scenario, the switch 16 establishes a monitoring connection between external communications systems. That is, a user at one external communications system is allowed to monitor the transmissions of one or more other external communications systems. For example, a cellular telephone user (such as, for example, an off-duty police officer) can monitor police band transmissions via the ITS 10, thereby circumventing the need for a separate police band radio. As can be appreciated, many other connection configurations are possible.

The controller 18 is operative for, among other things, controlling the operation of the switch 16, the plurality of wireless interface units 12*a*–12*n*, and the plurality of wired interface units 14*a*–14*n*. In one embodiment, the controller 18 determines the connections to be made between interface units and instructs the switch 16 to establish the connections. The controller 18 can determine the connections to be made in various ways. In one approach, the controller 18 receives connection requests from a user of the ITS 10 via user device 34 and user interface 22. For example, a user may desire that all communications from wired system 28*a* be broadcast to external communications systems coupled to wireless interface unit 12*a* and wireless interface unit 12*b*. The controller 18 will first determine whether the requested connection is authorized and will then instruct the switch 16 to establish the requested broadcast connection. In another approach, the controller 18 obtains the connection information from a communications signal received from one of the external communications systems by a corresponding interface unit. For example, a signal received by wireless interface 12*b* can include a request to monitor police band radio transmissions. The controller 18 will first check to determine whether the requesting party is authorized to establish the requested connection and, if so, will instruct the switch 16 to set up the connection. As can be appreciated, a number of other approaches for determining desired connections also exist. In addition, any combination of approaches can also be utilized.

The signal classifier 20 is operative for classifying incoming signals according to signal format. The signal classifier 20 can also be used to classify interference signals for use in interference mitigation procedures. The channel monitor 21 is operative for, among other things, monitoring the spectral environment about the ITS 10. In addition, the channel monitor 21 can be used to monitor the quality of communications through one or more of the interface units. As will be described in greater detail, the information generated by the signal classifier 20 and the channel monitor 21 can be used by the controller 18 to determine an optimal configuration for one or more of the interface units.

User interface 22 provides an interface between controller 18 and an external user device 34, thus allowing user control over the operation of the ITS 10. The user device 34 can include, for example, a personal computer having a central processing unit, a display, and a keyboard for command entry. Other types of user input/output devices can also be used.

It should be noted that the blocks illustrated in FIG. 1 represent functional elements that do not necessarily correspond to discrete hardware units. For example, in one embodiment of the present invention, many of the functions represented as blocks in FIG. 1 are implemented in software within a single digital processor. Many other hardware/software configurations are also possible.

In a preferred embodiment of the present invention, some or all of the wireless interface units 12a–12n and/or some or all of the wired interface units 14a–14n are dynamically and electronically reconfigurable. This allows the processing characteristics of the interface units to be easily modified in the field to conform with changing system requirements. By using electronically reconfigurable interfaces, the ITS 10 of the present invention can adapt to changing system requirements without requiring expensive redesigns or manual manipulation of equipment. This greatly extends the useful life of the ITS 10. If the signal format used by a particular external wireless communications system changes, for example, the controller 18 (or other functionality) can electronically reconfigure the wireless interface unit corresponding to that external system to operate with the revised signal format. In another scenario, an interface unit previously dedicated to a signal format that is no longer widely utilized in the telecommunications industry is reconfigured to operate with a different, more widely used signal format. Many other situations where reconfigurable interfaces are advantageous also exist.

In accordance with the present invention, the interface units can be reconfigurable via software and/or hardware. For example, in one approach, one or more of the interface units is implemented within a digital processing device (such as a general purpose microprocessor (GPP), a reduced instruction set computer (RISC), or a digital signal processor (DSP)) having an associated random access memory (RAM). The RAM includes interface software routines for use by the digital processing device in processing communication signals. Electronic reconfiguration of such an interface is performed by, for example, replacing an old routine stored in the RAM with a new routine corresponding to a new or revised signal format.

In another approach, one or more of the interface units is hardware reconfigurable. For example, an interface unit can be implemented within a field programmable gate array (FPGA) to provide the required processing functionality. As is well known in the art, FPGAs include a multitude of logic cells that can be selectively interconnected to perform a virtually limitless number of processing functions. To electronically reconfigure an FPGA, a configuration file is generally delivered to the FPGA designating the desired interconnections to be made between cells. Both analog and digital FPGA devices can be used in accordance with the present invention.

In another hardware-based approach, one or more of the interface units include conventional hardware processing elements having adjustable input values. For example, an interface unit can include a decryption unit having a variable key input or an IF filter having a variable pass band. In accordance with the present invention, the interface unit can be reconfigured by the controller 18 by delivering new input values to the various conventional hardware elements within the interface unit when conditions require. For example, if an external communications system changes a key being used to encrypt outgoing signals, the controller 18 can deliver the new key to the decryption unit within the interface unit after it learns of the new key value. In one application, the encryption key for an external system dynamically changes based upon, for example, an algorithm known by the controller 18. The controller 18 can track the changes in encryption key and dynamically adjust the key value used by the decryption unit within the interface unit. In another technique, the controller 18 can determine that a particular communications channel is very noisy and change a bandwidth value of an IF filter to compensate.

It should be appreciated that the interface units of the present invention can be implemented as a combination of software and hardware processing elements. For example, in one embodiment, the interface units are implemented using a combination of analog hardware processing equipment, FPGAs, and digital processing devices. Other combinations are also possible.

As illustrated in FIG. 1, the channel monitor 21 is linked to an antenna 32 for monitoring the spectral environment about the ITS 10. The antenna 32 is capable of sensing all electromagnetic energy about the ITS 10 that is within a frequency band of interest. The channel monitor 21 measures the frequency and magnitude of the electromagnetic energy to generate a spectral profile for the channel. In accordance with one aspect of the present invention, this spectral information is used by the controller 18 to determine an optimal configuration for one or more of the wireless interface units. For example, in one embodiment, a software-based interface unit includes multiple interface routines for use with a particular external communications channel. Each of the routines is optimized for use with a different channel noise level. During operation, the channel monitor 21 determines the current noise level within the communications channel and the controller 18 selects an interface routine for use in the interface unit based thereon. In another embodiment, the controller 18 uses the spectrum information to determine an optimal waveform to use within a particular communications channel. For instance, if it is found that there are one or more interference signals present within the channel, the controller 18 can decide to reconfigure an associated interface unit to transmit at a frequency removed from the interference signals (e.g., in a vacant portion of the spectrum). The ITS 10, however, must include some means for informing an intended recipient of the signal (i.e., a corresponding external communications entity) of the change in signal format.

The channel monitor 21 is also coupled to each of the interface units 12a–12n, 14a–14n for monitoring the quality of communications flowing through the units. In one embodiment of the invention, for example, the channel monitor 21 measures the bit error rate (BER) of received signals that were processed by each of the interface units 12a–12n, 14a–14n. Other quality metrics can also be monitored. In one embodiment of the invention, the ITS 10 uses the quality information from the channel monitor 21 to determine an optimal way to configure the interface units. For example, the controller 18 can be programmed to reconfigure an interface unit if the quality of communications through the unit falls below a particular threshold (e.g., if the BER exceeds a particular value). The controller 18 can also make other decisions based upon the information from the channel monitor 21.

As described above, the signal classifier 20 is operative for classifying incoming signals according to signal format. In a preferred embodiment of the present invention, as illustrated in FIG. 1, the signal classifier 20 is coupled to an input of each of the wireless interface units 12a–12n for classifying wireless signals received by the ITS 10. The signal classifier 20 can also be used to classify signals received from wired channels. In accordance with one aspect of the present invention, the controller 18 uses the signal classification information from the signal classifier 20 to determine an optimal configuration for the interface units.

For example, it can be determined that antenna 25n is receiving a relatively strong signal having a signal format that is not presently supported by corresponding wireless interface unit 12n. The controller 18 can decide to further investigate the signal by reconfiguring wireless interface unit 12n (or another interface unit) to process the identified signal format. Alternatively, the controller 18 can reconfigure wireless interface unit 12n to perform some form of interference mitigation on the signal to reduce interference with other signals being processed by wireless interface unit 12n. If the identified signal is also being sensed by other antennas in the ITS 10, the controller 18 can also reconfigure wireless interface units corresponding to those antennas. Other uses can also be made for the signal classification information from the signal classifier 20.

In another aspect of the present invention, ITS 10 is extensible for adding additional interface functionality. For example, expansion slots can be provided in switch 16 for adding additional hardware-based interface units. The expansion slots can be based upon, for example, standard, commercially available bus technology. Preprogrammed interface cards can also be made available in accordance with the present invention. These interface cards can be reconfigurable.

It should be appreciated that the ITS 10 of the present invention does necessarily convert all received signals to the common signal format. For example, if two or more external communications systems that utilize the same signal format are being linked, the signals can be directly switched without conversion. In addition, if two or more external systems are being linked that utilize some, but not all, of the same signal formatting (such as, for example, using different modulation types but the same voice coding type), received signals can be converted down to an intermediate signal format that is common to the two or more external systems. Intelligence can be provided within the controller 18 for determining when one of the above arrangements can be implemented. Also, in situations where two external systems utilizing different signal formats are to be connected, the controller 18 can provide for a direct conversion between signal formats in certain cases. That is, instead of converting the signals received from two external systems to the common signal format, the controller 18 can provide interface functionality for directly converting between the two signal formats.

Figure 2:
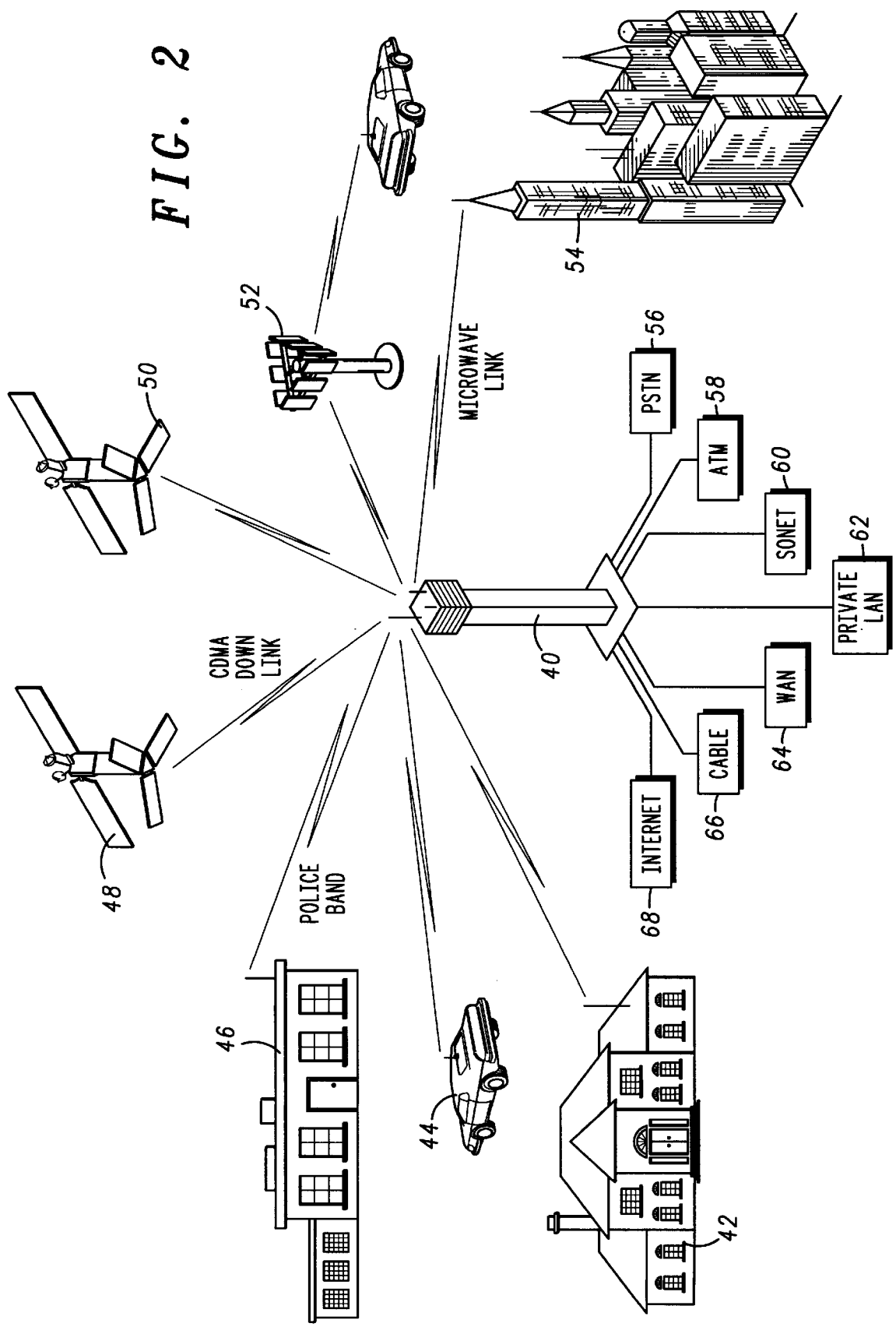
FIG. 2 is a diagram illustrating the information transfer system of FIG. 1 being used in a base station application.

FIG. 2 illustrates a base station application for the ITS 10 of FIG. 1. As shown, an ITS base station 40 can utilize one or more tower mounted antennas for achieving broad angular coverage. The ITS base station 40 is capable of supporting communications activity between a plurality of external communications entities simultaneously. For example, the ITS base station 40 can simultaneously support communications links to a personal residence 42, a mobile unit 44, a police band transmitter 46, a satellite-based communications system 48, the global positioning system (GPS) 50, a cellular base station 52, and an office building 54 having a private, internal local area network (LAN). The ITS base station 40 can also maintain wired links to external wired systems, such as: a public switched telephone network (PSTN) 56, an ATM network 58, a SONET network 60, a private LAN 62, a WAN 64, a cable television network 66, and the internet 68. Further, the ITS base station 40 can be linked to other external wired entities, such as individual terminals, displays, and/or audio equipment. In accordance with a preferred embodiment of the present invention, any one of the aforementioned external wired or wireless systems can be linked to any other of the systems or any combination of the other systems for communication therebetween. For example, a user in the office building 54 can communicate via microwave link to the ITS base station 40 to request a connection to the GPS system 50 to acquire accurate timing information. In another example, a user in residence 42 can request a link to cable network 66 for transfer of video information to the residence 42. In a further example, as discussed earlier, a mobile unit 44 can request a connection to police band transmitter 46 to monitor police band transmissions.

As is apparent from FIG. 2, the ITS 10 of the present invention is capable of multi-mode, multi-channel operation. That is, the ITS 10 can be scaled to support virtually any number of signal formats and any number of external communications systems. In addition, the ITS 10 can be designed to support virtually any number of concurrent communications connections.

Figure 3:
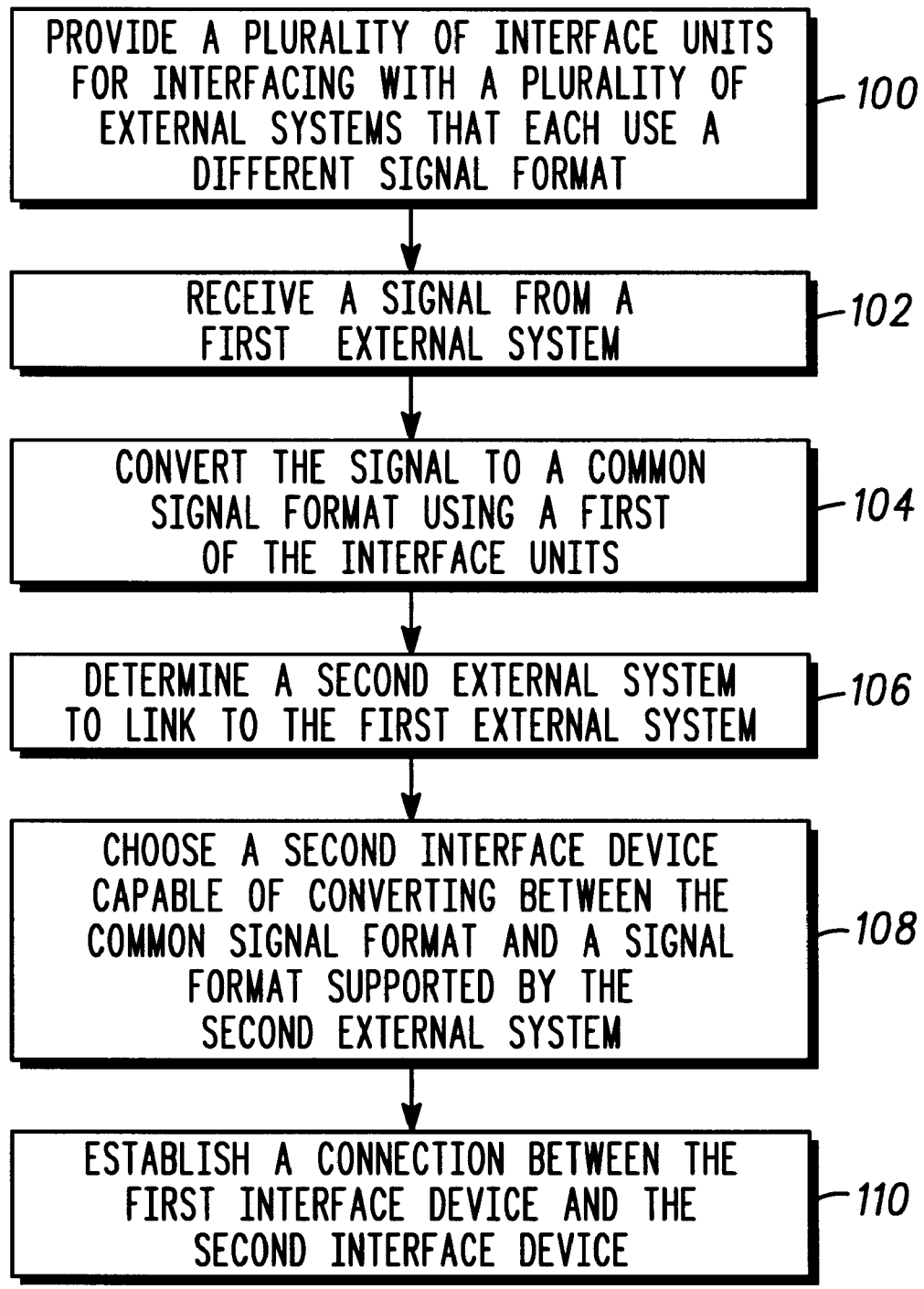
FIG. 3 is a flowchart illustrating a connection setup procedure that is followed in one embodiment of the present invention.

FIG. 3 is a flowchart illustrating a setup procedure that is followed in one embodiment of the present invention. The setup procedure allows any one of a plurality of external systems to request a connection to one or more other external systems. First, a plurality of interface units are provided for interfacing with the plurality of external systems (step 100). The plurality of interface units can include, for example, units for interfacing with both wired and wireless systems as illustrated in FIG. 1. Next, a signal is received from a first external system (step 102). The received signal is then converted to a common signal format used by the ITS 10 using an appropriate interface unit (step 104). The ITS 10 next determines a second external system to link to the first external system (step 106). For example, the ITS 10 can identify the second external system by reading a request portion of the received signal. The ITS 10 next chooses a second interface unit that is capable of converting between the common signal format and a signal format used by the second external system (step 108). Finally, a connection is established between the first interface unit and the second interface unit, thereby enabling communications between the first external system and the second external system (step 110). The above-described procedure can be modified to support virtually any type of connection between systems, such as a one way broadcast connection or a transmission monitoring connection. In addition, the above-described procedure can be modified to support other methods for determining which external communications systems to link together.

Figure 4:
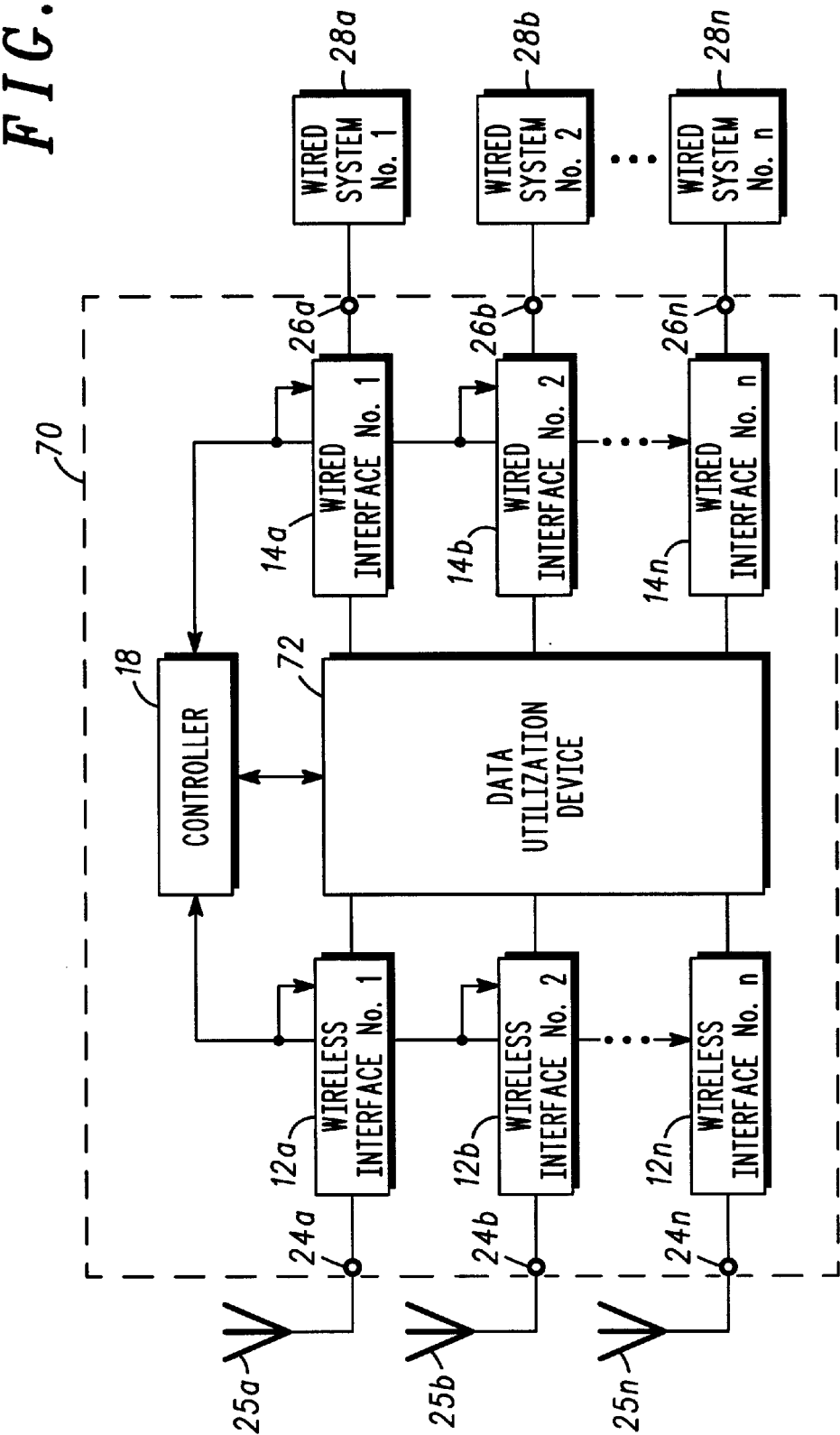
FIG. 4 is a block diagram illustrating an information transfer system in accordance with another embodiment of the present invention.

FIG. 4 is a block diagram illustrating an ITS 70 in accordance with another embodiment of the present invention. Where possible, the same reference numerals are used in FIG. 4 that were used in FIG. 1 to describe similar functionality. Like the previously described system, ITS 70 includes a plurality of wireless interface units 12a–12n, a plurality of wired interface units 14a–14n, and a controller 18. However, in place of the switch 16, the ITS 70 includes a data utilization device 72. The data utilization device 72 is a unit that can use information from any one of a plurality of different sources. For example, in one embodiment, the data utilization device 72 comprises a personal computer (either desktop or laptop) having an input/output device for interfacing with a user and a plurality of software applications, stored in a mass storage unit, for use by the user. Periodically, a user running one of the software applications can require data, or other information, from an external system. In such a case, the data utilization device 72, aided by the controller 18, establishes a communications link with the external system (via an appropriate interface unit) to obtain the data. As before, multiple communications links can be opened simultaneously. In a preferred embodiment, the data utilization device 72 can transmit and/or receive information to/from any of the external systems or broadcast information to some or all of the external systems.

In one embodiment of the invention, as illustrated in FIG. 5, the ITS 70 of FIG. 4 is implemented in a handheld communicator 78. In this embodiment, the data utilization device 72 can include, for example, a display for displaying information to a user 76 of the handheld communicator 78 and an input device for accepting instructions and/or data from the user 76. As shown, the handheld communicator 78 is capable of establishing a wireless connection with one or more of a plurality of external wireless systems 42–54 while being carried by a mobile user 76. The plurality of external wireless systems can include, for example, a residence 42, a mobile unit 44, a police band transmitter 46, a satellite communications system 48, the GPS system 50, a cellular base station 52, and/or an office building 54. Because the ITS 70 is embodied in a mobile handheld communicator 78, it is not shown as being connected to external wired systems. However, in accordance with one embodiment of the present invention, communication ports are provided on the handheld communicator 78 for enabling connection to one or more wired systems. For example, the handheld communicator 78 can include a phone jack for connection to a PSTN. Likewise, the handheld communicator 78 can include a coaxial connector for use in coupling to a cable television network. These ports can be utilized, for example, when the user 76 is at home or when the user 76 is staying at a temporary residence, such as a hotel.

During operation of the handheld communicator 78, the user 76 may decide that he wants to establish a communications link with a party in office building 54. The user 76 enters an appropriate request into the handheld communicator 78 using, for example, a keypad on the communicator 78. A request signal is then transmitted from the communicator 78 to the office building 54. A LAN controller in the office building 54 then determines whether the user 76 is authorized to access the office building's LAN. If authorized, the LAN controller establishes the requested connection. It should be appreciated that the handheld communicator 78 will only be able to communicate with systems within a predetermined range. In general, as is well known in the art, the range will depend on factors such as transmit power level, antenna directivity, and receiver sensitivity. It should further be appreciated that the maximum range for each of the external systems will vary from system to system.

With reference to FIG. 5, it should be noted that a single handheld communicator 78 including ITS 70 is capable of replacing a plurality of individual dedicated radio units. That is, user 76 no longer requires a separate police band radio, cellular telephone, satellite transceiver, etc. In addition, user 76 is able to emulate signals used by other systems to bypass normal methods of using the system. For example, residence 42 can include a wireless local loop antenna for communicating with a wireless local loop base station (not shown). During normal operation of the wireless local loop, to establish a connection with a user in the residence, the wireless local loop base station sends a signal having an appropriate signal format to the wireless local loop antenna mounted on the residence 42. When the user within the residence 42 picks up a telephone to answer, the communications link between the wireless local loop base station and the user is established. In accordance with the present invention, the handheld communicator 78 can emulate the signal normally delivered from the wireless local loop base station to the wireless local loop antenna mounted on residence 42 to establish a connection with the user in residence 42, without going through the associated communication system.

In addition to the above described functions, the ITS 70 can also be used to perform a switching function as described earlier in connection with ITS 10. As before, connections can be established between different external systems via ITS 70 regardless of whether ITS 70 is implemented in a stationary or a mobile configuration. It should be noted, however, that in mobile applications the ITS 70 will have to remain in communication range of all external systems involved in a given connection for the duration of the communication.

It should be appreciated that the above description relates to specific embodiments of the invention and is not meant to be limiting in any respect. That is, modifications can be made to the above-described embodiments without departing from the spirit and scope of the invention. For example, an information transfer system can be implemented that utilizes only wireless interface units without any wired system interconnections. In addition, various elements in the described structures can be combined, modified, or eliminated without necessarily departing from spirit and scope of the invention.

What is claimed is:

1. An information transfer system for use in linking multiple communications systems, comprising:

a group of interface units including:

a plurality of wireless interface units each capable of converting a signal between a unique wireless signal format and a common signal format, wherein said unique wireless signal format for each of said plurality of wireless interface units is different from that of at least one other wireless interface unit in said plurality of wireless interface units, said plurality of wireless interface units each coupled to an antenna port for communication with an antenna, and a plurality of wired interface units each capable of converting a signal between a unique wired signal format and said common signal format, wherein each of said plurality of wired interface units is coupled to a signal port for communication with an external wired communications system; and a switch coupled to each of said interface units in said group of interface units in a manner that permits a transfer of signals having said common signal format between said switch and said interface units, said switch being configurable for selectively connecting a first interface unit in said group of interface units to a second interface unit in said group of interface units for enabling communication between said first interface unit and said second interface unit, wherein said switch is configurable for selectively connecting a third interface unit in said group of interface units to a fourth interface unit in said group of interface units for enabling communications between said third interface unit and said fourth interface unit, wherein said communications between said third interface unit and said fourth interface unit occur concurrently with said communications between said first interface unit and said second interface unit.

2. The information transfer system, as claimed in claim 1, wherein:

said group of interface units includes at least one first interface unit that can be repeatedly reconfigured to operate with varying signal formats.

3. The information transfer system, as claimed in claim 2, wherein:
said first interface unit is implemented using a field programmable gate array (FPGA) having an input for receiving configuration information.

4. The information transfer system, as claimed in claim 2, wherein:
said first interface unit is implemented using a digital processing device having a random access memory (RAM), said digital processing device being capable of executing routines stored in said RAM, wherein said routines stored in said RAM can be modified to adapt to different signal formats.

5. The information transfer system, as claimed in claim 2, wherein:
said group of interface units includes multiple first interface units.

6. The information transfer system, as claimed in claim 1, wherein:
said plurality of wireless interface units includes an interface unit for converting a signal between a satellite communications format and said common signal format.

7. The information transfer system, as claimed in claim 1, wherein:
said plurality of wireless interface units includes a unit for converting a signal between a code division multiple access (CDMA) based format and said common signal format.

8. The information transfer system, as claimed in claim 1, wherein:
said plurality of wired interface units includes a unit for converting a signal between an asynchronous transfer mode (ATM) based format and said common signal format.

9. The information transfer system, as claimed in claim 1, further comprising:
a channel monitor for monitoring channel quality, said channel monitor generating a channel quality signal.

10. The information transfer system, as claimed in claim 9, further comprising:
means for reconfiguring an interface unit based on said channel quality signal.

11. The information transfer system, as claimed in claim 1, wherein:
said information transfer system is adapted for use in a fixed location.

12. The information transfer system, as claimed in claim 11, wherein:
said information transfer system is implemented in a communications base station.

13. The information transfer system, as claimed in claim 11, wherein:
said information transfer system is implemented in a home.

14. The information transfer system, as claimed in claim 1, wherein:
said information transfer system is located within a mobile communicator.

15. The information transfer system, as claimed in claim 14, wherein:
said mobile communicator is a handheld communicator unit.

16. The information transfer system, as claimed in claim 1, further comprising:
a signal classifier for determining a signal format of a signal received from an external communications channel.

17. The information transfer system, as claimed in claim 1, wherein:
said first interface unit and said third interface unit are the same unit.

18. The information transfer system, as claimed in claim 1, wherein:
said third interface unit and said fourth interface unit are each different from said first interface unit and said second interface unit.

19. The information transfer system, as claimed in claim 1, wherein:
said switch is capable of establishing a connection between a wireless interface unit and another wireless interface unit.

20. The information transfer system, as claimed in claim 1, wherein:
said switch is capable of establishing a connection between a wireless interface unit and multiple wired interface units.

21. The information transfer system, as claimed in claim 1, wherein:
said switch is capable of establishing a connection between a wired interface unit and multiple wireless interface units.

22. The information transfer system, as claimed in claim 1, wherein:
said switch is capable of establishing a connection between multiple wired interface units and multiple wireless interface units.

23. The information transfer system, as claimed in claim 1, wherein:
said switch is capable of establishing a connection between any one of the following combinations: a wireless interface unit and a wired interface unit, a wireless interface unit and another wireless interface unit, a wired interface unit and another wired interface unit, a wireless interface unit and multiple wired interface units, and a wired interface unit and multiple wireless interface units.

24. The information transfer system, as claimed in claim 1, wherein:
said plurality of wireless interface units includes at least three units.

25. A method for use in an information transfer system having a plurality of interface units and a switch for selectively connecting multiple interface units in said plurality of interface units together to enable communications between said multiple interface units, wherein each of said plurality of interface units is operative for converting a signal between a unique signal format and a common signal format that is common to said plurality of interface units, wherein said unique signal format for each of said plurality of interface units is different from that of at least one other interface unit in said plurality of interface units, said method comprising the steps of:
receiving a signal from a first external communications system, said signal having a first signal format;
converting said signal from said first signal format to the common signal format in a first interface unit in the plurality of interface units;
determining at least one second external communications system that is to communicate with said first external communications system, said at least one second external communications system supporting at least one second signal format that is different from the first signal format;

selecting at least one second interface unit from said plurality of interface units based on said at least one second signal format; and establishing a connection between said first interface unit and said at least one second interface unit.

26. The method, as claimed in claim 25, wherein:

said first signal format is a wireless signal format and said at least one second signal format is a wired signal format.

27. The method, as claimed in claim 25, wherein:

said first signal format and said at least one second signal format are wireless signal formats.

28. The method, as claimed in claim 25, wherein:

said step of determining includes reading request information from said signal.

29. The method, as claimed in claim 25, wherein:

said step of determining includes receiving connection information from a source external to said information transfer system.

30. The method, as claimed in claim 29, wherein:

said source external to said information transfer system includes a user of said information transfer system.

31. The method, as claimed in claim 25, further comprising:

reconfiguring a third interface unit in said plurality of interface units in response to a predetermined occurrence.

32. The method, as claimed in claim 31, wherein:

said predetermined occurrence includes a change in a signal format of an external communications system.

33. The method, as claimed in claim 31, wherein:

said predetermined occurrence includes a determination that a communication quality metric value is within a predetermined range.

34. The method, as claimed in claim 33, wherein:

said communication quality metric value includes a bit error rate (BER) value.

35. The method, as claimed in claim 31, wherein:

said third interface unit is implemented using a field programmable gate array (FPGA); and said step of reconfiguring includes delivering a configuration file to said FPGA.

36. The method, as claimed in claim 31, wherein:

said third interface unit is implemented using a digital processing device having a random access memory (RAM) for storing at least one software routine; and said step of reconfiguring includes delivering a new software routine to said RAM.

37. The method, as claimed in claim 25, wherein:

said step of determining includes choosing a plurality of different external communications systems, wherein at least two of said plurality of different external communications systems utilize different signal formats from one another.

38. The method, as claimed in claim 37, wherein:

said step of selecting includes selecting an interface unit for each of said different signal formats.

39. A communicator for use in communicating with multiple external communications systems utilizing different signal formats, comprising:

a group of interface units including a plurality of wireless interface units each capable of converting a signal between a unique wireless signal format and a common signal format, wherein said unique wireless signal format for each of said plurality of wireless interface units is different from that of other wireless interface units in said plurality of wireless interface units and said common signal format is common to interface units in said group of interface units, wherein each of said plurality of wireless interface units is coupled to an antenna port for communication with an antenna;

a data utilization device coupled to said group of interface units for utilizing signals having said common signal format; and a controller, coupled to said data utilization device, comprising:
means for determining at least one external communications system with which to communicate,
means for selecting at least one interface unit associated with said at least one external communications system, and
means for controlling a transfer of signals between said data utilization device and said at least one interface unit during communication with said at least one external communications system, wherein said communicator can communicate with multiple external communications systems simultaneously.

40. The communicator, as claimed in claim 39, wherein:

said group of interface units further comprises a plurality of wired interface units each capable of converting a signal between a unique wired signal format and said common signal format, wherein each of said plurality of wired interface units is coupled to a signal port for communication with an external communications system.

41. The communicator, as claimed in claim 39, wherein said communicator is a mobile unit.

42. The communicator, as claimed in claim 41, wherein said communicator is a handheld unit.

43. The communicator, as claimed in claim 39, wherein:

said means for determining includes means for receiving commands from a user of the communicator.

44. The communicator, as claimed in claim 39, wherein:

said data utilization device includes a display for displaying received information to a user of said communicator.

45. The communicator, as claimed in claim 39, wherein:

said data utilization device includes a data processor for processing information received from said at least one external communications system.

46. The communicator, as claimed in claim 39, wherein:

said data utilization device includes switching means for use in transferring data received from a first external communications system to an interface unit corresponding to a second external communications system to effect communications between said first external communications system and said second external communications system.

* * * * *